United States Patent
Villegas (10) Patent No.: US 12,465,040 B2
(45) Date of Patent: Nov. 11, 2025

(54) POLEBORNE THRUSTABLE ARTHROPOD TRAP

(71) Applicant: Gabriel Villegas, Caldwell, ID (US)

(72) Inventor: Gabriel Villegas, Caldwell, ID (US)

(*) Notice: Subject to any disclaimer, the term of this patent is extended or adjusted under 35 U.S.C. 154(b) by 665 days.

(21) Appl. No.: 16/235,101

(22) Filed: Dec. 28, 2018

(65) Prior Publication Data

US 2020/0205391 A1 Jul. 2, 2020

(51) Int. Cl.
*A01M 3/00* (2006.01)
(52) U.S. Cl.
CPC ................................... *A01M 3/00* (2013.01)
(58) Field of Classification Search
CPC ............ A01M 3/00; A01M 3/02; A01M 1/10; A01M 1/103; A01M 1/106
See application file for complete search history.

(56) References Cited

U.S. PATENT DOCUMENTS

| | | | | |
|---|---|---|---|---|
| 629,998 | A | * | 8/1899 | Jacobs ................... A01M 3/00 43/134 |
| 2,129,217 | A | * | 9/1938 | Kahler ................. A01M 3/027 43/135 |
| 2,151,242 | A | * | 3/1939 | Souply ................... A01M 3/02 43/135 |
| 4,450,649 | A | * | 5/1984 | Dunwoody ........... A01M 3/027 124/16 |
| 4,676,022 | A | * | 6/1987 | Wraight ................ A01M 3/022 43/121 |
| 4,817,330 | A | | 4/1989 | Fahringer |
| 4,905,408 | A | | 3/1990 | Wu |
| 5,207,018 | A | | 5/1993 | Reaver et al. |
| D339,841 | S | * | 9/1993 | Gelinas ........................ D22/122 |
| 5,537,777 | A | | 7/1996 | Geeting |
| 6,067,746 | A | | 5/2000 | Kistner et al. |
| 6,112,452 | A | | 9/2000 | Campbell |
| 6,497,070 | B1 | | 12/2002 | Snell et al. |

(Continued)

FOREIGN PATENT DOCUMENTS

| | | | | |
|---|---|---|---|---|
| DE | 4322460 | A1 | * 2/1994 | ............. A01M 3/00 |
| GB | 2393893 | A | * 4/2004 | ........... A01M 3/002 |
| NL | 8303400 | A | * 10/1983 | |

OTHER PUBLICATIONS

Translation of NL8303400A provided (Year: 1983).*

(Continued)

*Primary Examiner* — Peter M Poon
*Assistant Examiner* — Shada Mohamed Alghailani
(74) *Attorney, Agent, or Firm* — Burdick Patents, P.A.; Sean D. Burdick; Colin L. Honan (57) ABSTRACT

A poleborne thrustable arthropod trap allows a user to kill or capture an arthropod from a safe distance. The trap includes a tube, a pole extending through the tube, and a handle stop attached to a proximal end of the pole to limit distal extension of the pole. A receptacle having a distal opening is attached to a distal end of the tube, and a disk moveable within the receptacle is attached to a distal end of the pole to limit proximal retraction of the pole. A user wielding the tube may shove the receptacle against a surface to enclose an arthropod within the receptacle. The user may then thrust the k to kill the arthropod, or slowly push the disk to coax the arthropod into the receptacle then retract the disk to trap the arthropod.

19 Claims, 6 Drawing Sheets

(56) References Cited

U.S. PATENT DOCUMENTS

| | | | |
|---|---|---|---|
| 6,564,505 B1 | 5/2003 | Anderson | |
| 6,651,379 B1 | 11/2003 | Nelson | |
| 7,076,916 B2* | 7/2006 | Bianchini | A01M 1/2038 |
| | | | 222/174 |
| 7,152,365 B2* | 12/2006 | Wyers | A01M 1/06 |
| | | | 43/139 |
| 7,469,501 B1* | 12/2008 | Blum | A01M 3/04 |
| | | | 43/136 |
| 7,721,486 B2 | 5/2010 | Rosario | |
| 8,567,114 B1* | 10/2013 | Drapeau | A01M 3/04 |
| | | | 43/136 |
| 8,925,243 B1 | 1/2015 | Vasquez et al. | |
| 8,978,290 B2 | 3/2015 | Wright | |
| 9,010,017 B2 | 4/2015 | Southard | |
| 9,066,511 B2 | 6/2015 | McKnight et al. | |
| 9,179,664 B2 | 11/2015 | Ogilvie | |
| 10,524,462 B2* | 1/2020 | Sapienza | A01M 1/10 |
| 2008/0040967 A1* | 2/2008 | Young | A01M 3/04 |
| | | | 43/136 |
| 2009/0044443 A1* | 2/2009 | Flaherty | A01M 3/00 |
| | | | 43/110 |
| 2009/0293853 A1* | 12/2009 | Belokin | F41B 7/02 |
| | | | 124/16 |
| 2010/0058645 A1* | 3/2010 | Reime | A01M 3/00 |
| | | | 43/110 |
| 2013/0097917 A1* | 4/2013 | Shofet | A01M 3/00 |
| | | | 43/107 |
| 2014/0047759 A1* | 2/2014 | Almy | A01M 3/00 |
| | | | 43/134 |
| 2014/0157653 A1* | 6/2014 | Gellani | A01M 13/003 |
| | | | 43/125 |
| 2014/0245657 A1* | 9/2014 | Kirschbaum | A01M 3/027 |
| | | | 43/135 |
| 2017/0347639 A1* | 12/2017 | Sapienza | A01M 1/10 |
| 2018/0184636 A1* | 7/2018 | Yamamoto | A01M 3/00 |
| 2020/0060253 A1* | 2/2020 | Stokes | A01M 3/00 |

OTHER PUBLICATIONS

BugASalt. https://www.bugasalt.com/. Apr. 2, 2018.
BugZooka. http://www.bugzooka.com/. Apr. 2, 2018.
Catcha Vacuum Bug Catcher. https://www.amazon.com/dp/B077SH112C/ref=asc_df_B077SH112C5425323/?tag=hyprod-20&creative=395033&creativeASIN=B077SH112C&linkCode=df0&hvadid=241948926915&hvpos=101&hv netw=g&hvrand=8709848145263014867&hvpone=&hvptwo=&hvqmt=&hvdev=c&hvdvcmdl=&hvlocint=&hvlocphy=9022894&hvtargid=pla-604486531632. Apr. 2, 2018.
My Critter Catcher. https://mycrittercatcher.com/. Apr. 2, 2018.
Stink Bug Chute. https://www.homedepot.com/p/Stink-Bug-Chute-48-in-Bug-Catching-Capturing-Device-SBC-1-Box/205492069?cm_mmc=Shopping%7cTHD%7cgoogle%7c&mid=s5ci3YM6F%7cdc_mtid_8903jx325196_pcrid_246182687215_pkw_pmt_product_205492069_slid_&gclid=EAIaIQobChMI9qvaiOab2glVgyWBCh1pOwufEAQYAiABEgJGZvD_BwE&dclid=CMmDjl7mm90CFdZ4wQodPt8DMg#product_description. Apr. 2, 2018.
The Best Bug Vacuum. https://www.hammacher.com/product/best-bug-vacuum?promo=Home-Living-Vacuums. Apr. 2, 2018.
The Bug Blaster. http://www.thebugblaster.com. Apr. 2, 2018.

* cited by examiner

POLEBORNE THRUSTABLE ARTHROPOD TRAP

BACKGROUND OF THE INVENTION

Field of the Invention

The present invention relates generally to insect traps and arachnid traps, more specifically to a manually-operated arthropod trap, and most specifically to a poleborne arthropod trap that can be manually operated at a safe distance from an arthropod either for killing an arthropod or for safely capturing an arthropod and carrying it to a new location.

Description of Related Art

Insects and arachnids (hereafter collectively "arthropods" or "bugs") are known to invade the living space of human beings, where the arthropods are generally unwanted. Many different types of arthropod traps are known in the art. For example, a common type of ant trap contains poison within a small plastic housing that may be placed on the ground near ant trails. Small openings in the housing allow ants access to the poison, which is carried back to eradicate the colony. Another example is fly paper, which typically consists of a ribbon of sticky material coated with an attractant or poison that can be suspended from a ceiling or door jamb. Houseflies and other flying insects that come into contact with the ribbon are immobilized by the sticky glue and eventually killed. A known trap for spiders works on similar principles, and consists essentially of a small housing containing a sticky floor that is placed on the ground.

While the foregoing solutions may be effective in some situations, they are not suitable for trapping all manner of arthropods. Flying insects such as bees and wasps are not attracted to fly paper, and many spiders are known to hang out on walls, ceilings, and other hard-to-reach places where spider traps cannot be deployed. Moreover, the foregoing solutions are malevolent, and are not desirable for people who intend to capture or relocate bugs, rather than killing them.

Some benevolent solutions for capturing and relocating arthropods have been proposed. U.S. Pat. No. 5,207,018 to Reaver et al. discloses a handle-held fly swatter having a housing attached at its distal end. An aperture in the housing can be opened or closed by means of a sliding mechanism attached to the handle, to allow an insect entry within the housing, wherein the insect may be trapped by sliding the aperture closed. This device, however, cannot be used effectively to kill or trap arthropods that hang to ceilings, because the aperture faces in a direction perpendicular to the longitudinal axis of the handle; that is, the aperture is positioned so that it can only surround an insect when the housing is slapped against a flat surface. A user extending the device upward would therefore have difficulty flattening the housing against the ceiling to capture a bug.

U.S. Pat. No. 5,537,777 to Geeting discloses an insect capture device consisting of a hollow pole having a shaft moveable within the pole and connected to a distal head of soft tissue-like foam material. In operation, the pole is extended manually toward an insect so that the soft material surrounds the insect, whereupon the head is retracted into the hollow pole, compressing the soft material and trapping the insect therein. The insect can then be carried to another location and released by extending the head outside the pole. Problems with this design include the possibility of non-capture, as an insect clinging to the surface of a wall may not be swept into the pole, as well difficulty in releasing a trapped insect that clings to the soft material after capture. Another shortcoming is that this device does not provide the user with an effective option for killing an arthropod, if desired, and may not provide a safe means for handling potentially harmful insects such as bees and wasps.

Another insect capture device is disclosed by Wyers in U.S. Pat. No. 7,152,365, which was at one time marketed under the trade name Bugzooka. The Wyers device is essentially a hollow elongated tube having a spring-loaded diaphragm and air valve that creates a vacuum pressure at a distal opening when the valve is manually actuated. Insects in close proximity to the distal opening are drawn into the tube when the vacuum pressure is triggered, and trapped therein by closure of the opening caused by the same triggering action. While this device can be effective for trapping insects, the design is complex, expensive to manufacture, and its valve and diaphragm are prone to wear and malfunction over time. This device is also intended only for benevolent capture, and is not especially effective for use in killing bugs, nor does it provide a safe means for handling potentially harmful bugs.

What is needed is a simple device that allows a user to reach from a safe distance arthropods located on ceilings and walls, and that provides the user with an option to either trap the arthropod or kill it.

SUMMARY OF THE INVENTION

The present invention provides a solution for trapping or killing an arthropod from a safe distance. Ideally, the invention can be used to remove insects or spiders from ceilings and walls. An apparatus according to the invention is relatively lightweight and inexpensive, with few component parts, and is designed to be manually operated.

One embodiment according to the invention of a poleborne thrustable arthropod trap is an assembly that includes a pole, a tube, a handle stop, a receptacle, and a disk, and a connector. The pole extends through the interior hollow channel of the tube. The handle stop is attached to a proximal end of the pole and has two main functions—to provide a handle or gripping surface for a user handling the trap, and to limit distal extension of the pole through the tube, by configuring the handle stop with a width greater than an inner diameter of the tube. The pole has a length that exceeds the length of the tube, to allow a user to extend the pole through and beyond a distal end of the tube while gripping the handle stop near the proximal end of the tube. To allow translation of the pole within the tube, the width or outer diameter of the pole is equal to or less than the inner diameter of tube. The trap is configured to allow a user to wield the trap like a spear or polearm-type weapon, and enable the user to thrust the distal receptacle at an arthropod to trap the arthropod within the receptacle, and subsequently to thrust the pole either through the tube in a distal direction to squash the arthropod or in a proximal direction to trap the arthropod.

In one embodiment, the trap includes a means for causing friction between the pole and the tube when the pole is translated through the tube. The pole cooperates with tube to introduce sufficient friction or mechanical interference between the pole and tube to maintain a position of the pole within the tube when the tube is stationed substantially vertically and the pole is under force of gravity only. In one embodiment, the friction is effected by the tube forming a slight arc or bow from the distal end of the tube to a proximal end of the tube.

The receptacle is attached to the distal end of the tube and provides a vessel for trapping an arthropod. The receptacle may be attached either directly to the tube, or indirectly by means of an optional connector. In one embodiment, the receptacle has an opening at its proximal end that allows the distal end of the pole to penetrate into the receptacle. The receptacle also has an opening at its distal end, which, in benevolent usage of the trap allows an anthropod to enter the interior of the receptacle through a gap. The opening in the receptacle at its proximal end has a first inner diameter, and the opening in the receptacle at its distal end has a second inner diameter, wherein the first inner diameter is less than a diameter of the disk, and wherein the second inner diameter is greater than the diameter of the disk.

The disk is attached to a distal f pole, is moveable within the receptacle, and is configured to limit proximal retraction of the pole through the tube. A retracted position is achieved by a user withdrawing the pole in a proximal direction through tube until the perimeter of the disk seals to an interior wall of the receptacle, where disk reaches its proximal limit within the receptacle. The receptacle and disk are configured to seal an interior volume of the receptacle to prevent an arthropod enclosed therein from escaping through any gap between the perimeter of the disk and the inner wall of the receptacle. The receptacle is preferably a transparent plastic, and may be attached directly to the distal end of tube, or indirectly by means of a specially formed connector. An extended position is achieved by a user translating the pole in a distal direction through the tube. In the extended position, the disk may align with the distal end of the receptacle, or may rest distally beyond the distal end of the receptacle.

In operation, a user can manipulate a poleborne thrustable arthropod trap to kill or capture an arthropod from a safe distance, to trap an arthropod against a flat surface. A user wields the trap by grasping the tube at an intermediate location with one hand, preferably near the proximal end, and by grasping the handle stop with the other hand. With the pole withdrawn to a proximal position, the user thrusts the trap toward the arthropod, so that the distal end of the receptacle contacts the flat surface where the arthropod is lurking, suddenly enclosing the arthropod within the receptacle and against the flat surface. The user may then, by distal extension of the pole through the tube, thrust the disk against the flat surface to squash and kill the arthropod. Alternatively, the user may slowly push the disk toward the arthropod to coax the arthropod into the receptacle by opening a pathway into the receptacle, to be trapped therein and carried to another location.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The present invention provides a solution for trapping or killing an arthropod from a safe distance. Ideally, the invention can be used to remove insects or spiders from ceilings and walls. An apparatus according to the invention is relatively lightweight and inexpensive, with few component parts, and is designed to be manually operated.

Figure 1:
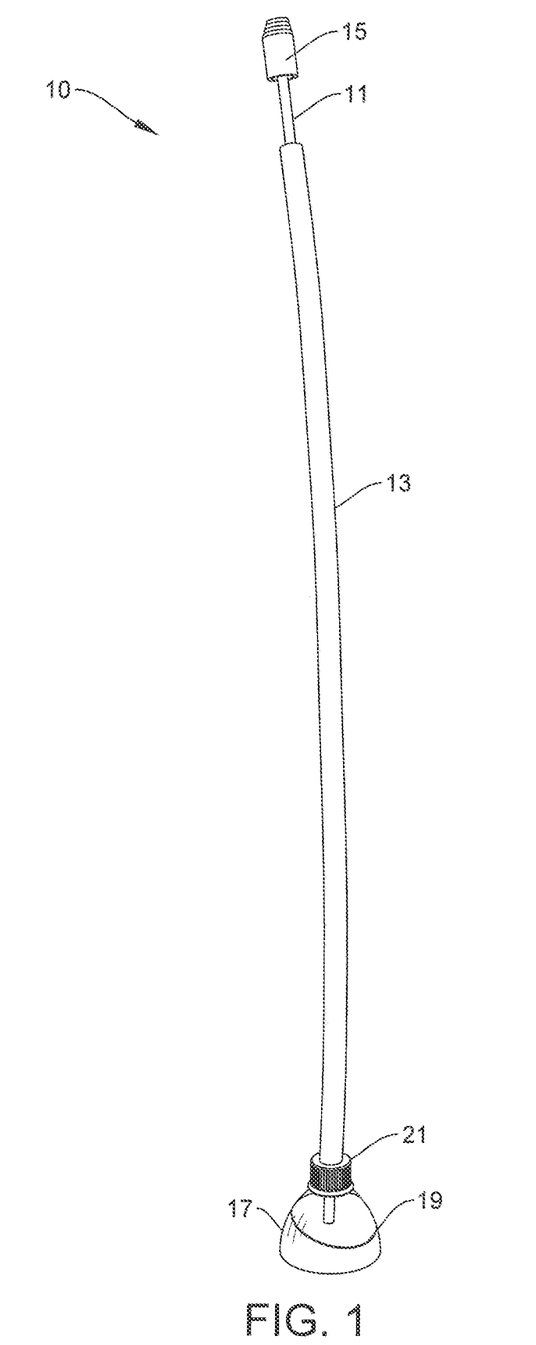
FIG. 1 is a perspective view of one embodiment according to the invention of a poleborne thrustable arthropod trap.

FIG. 1 shows a perspective view of one embodiment according to the invention of a poleborne thrustable arthropod trap 10. The trap 10 is an assembly that includes a pole or rod 11, a tube 13, a handle stop 15, a receptacle 17, a disk 19, and a connector 21. The pole 11 extends through the interior hollow channel of the tube 13. The handle stop 15 is attached to a proximal end of the pole 11 and has two main functions. Handle stop 15 provides a handle or gripping surface for a user handling the trap, and handle stop 15 limits distal extension of the pole 11 through the tube 13. In one embodiment, handle stop 15 is a generally cylindrical member, as shown, that has an outer diameter that is greater than an inner diameter of the tube 13. This dimensional difference stops progress of the pole 11 in a distal direction when the handle stop 15 abuts the proximal end of the tube 13. In other embodiments, handle stop 15 may have alternative shapes or designs, so long as it attaches to the proximal end of the pole 11 and has a diameter or width greater than that of the channel defined through the tube 13.

During use, the handle stop 15 is preferably gripped by one hand of a user, while the other hand of the user grips the tube 13 at an intermediate position along the tube. Tube 13 may be formed from a rigid material such as aluminum, steel, or plastic pipe. In one embodiment, tube 13 is formed from a metal or plastic material that is substantially rigid but slightly flexible, such as ½-inch Schedule 40 PVC round plastic pipe. The length of tube 13 may vary according to end usage, however in one preferred embodiment the length of tube 13 is between about 3 feet and about 6 feet. Other materials, cross-sectional shapes, sizes, lengths, and thicknesses for tube 13 are possible within the scope of the invention.

Pole 11 is an elongated, rigid member that is preferably formed from material such as wood, plastic, or metal. The length of pole 11 exceeds the length of tube 13, to allow a user to extend the pole 11 through and beyond a distal end of the tube 13 while gripping handle stop 15 near the proximal end of the tube 13. The width or outer diameter of pole 11 must therefore be equal to or less than the inner diameter of tube 13. In one embodiment, the width or outer diameter of pole 11 is between about 0.25 inches and about 0.5 inches, and the length of pole 11 is between about 4.0 feet and about 7.0 feet. Pole 11 may be generally cylindrical, or may comprise a rod having a cross section other than circular.

An arthropod trap according to the invention is "poleborne" because the component parts of the trap when in use are all attached to, or supported by the pole 11. An arthropod trap according to the invention is "thrustable" because the elongated construction of the pole 11 and tube 13 allow a user to wield the trap 10 like a spear or polearm-type weapon, and enable the user to thrust the distal receptacle 17 at an arthropod to trap the arthropod within the receptacle, and subsequently to thrust the pole 11 either through the tube 13 in a distal direction to squash the arthropod or in a proximal direction to trap the arthropod. Construction of the trap 10 must enable quick, thrusting, manual movement of the pole 11 through the tube 13 to enable capture of elusive arthropods such as house flies, roaches, and some types of spiders.

In one embodiment, the trap 10 includes a means for causing friction between the pole 11 and the tube 13 when the pole is translated through the tube. The friction means may be effected in various ways. In one implementation, the friction may be achieved by a round pole 11 having substantially the same outer diameter as the inner diameter of the tube 13. In another implementation, the friction may be achieved by a pole 11 having an oval cross-section having a maximum width substantially the same as the inner diameter of the tube 13. In another implementation, the friction may be achieved by a non-circular pole or rod having a width substantially equal to the inner diameter of the tube 13. FIGS. 6A, 6B, 6C, and 6D show various alternative cross-sectional shapes of a pole 11. Whatever design is chosen for pole 11, the pole should be configured to cooperate with tube 13 to introduce sufficient friction or mechanical interference between the pole and tube to maintain a position of the pole within the tube when the tube is stationed substantially vertically and the pole is under force of gravity only.

In another embodiment of the invention, tube 13 is made from a slightly flexible and resilient material, and forms a slight arc or bow from the distal end of the tube to a proximal end of the tube. For example, the arc formed by tube 13 may have a height-to-width ratio between about 0.02 and 0.03, where the width is the length of a chord that subtends the arc from one end to the other, and where the height is the distance from the midpoint of the chord to the apex of the arc. In another example, such an arc formed by tube 13 has a chord length of about 42 inches and has a height from midpoint to apex of about 1 inch. In this embodiment, a rigid, straight pole or rod 11, having a length of about 4 feet, when translated trough the tube 13 in either the distal or proximal direction will at one or more points interfere with the curved inner surface of the tube. These interference points provide the desired friction that will tend to maintain the position of the pole 11 with respect to the tube when the pole is at rest, and still allow the pole 11 to be manually translated through the tube 13 without much difficulty. In one embodiment, the inner diameter of tube 13 is between about 0.5 inches and about 0.75 inches.

Figure 2:
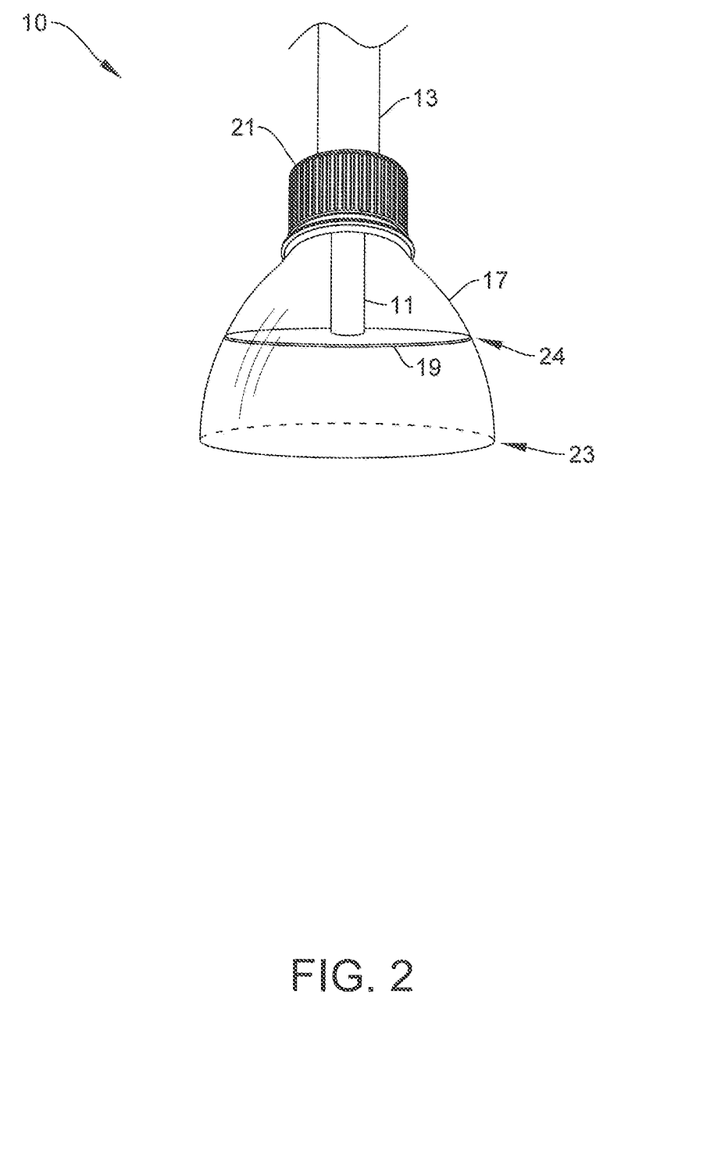
FIG. 2 is a magnified view of a distal end of the poleborne thrustable arthropod trap of FIG. 1, shown with the disk retracted.

FIG. 2 shows a magnified view of a distal end of the poleborne thrustable arthropod trap 10. The receptacle 17 is attached to the distal end of the tube 13 and provides a vessel for trapping an arthropod. The receptacle 17 may be attached either directly to the tube 13 or indirectly by means of an optional connector 21, as shown. In one embodiment, the receptacle 17 has an opening at its proximal end that allows the distal end of pole 11 to penetrate into the receptacle 17. Receptacle 17 also has an opening at its distal end 23, which, in benevolent usage of trap 10 allows an arthropod to enter the interior of the receptacle through a gap 25. Preferably, the opening in receptacle 17 at is proximal end has a first inner diameter, and the opening in receptacle 17 at its distal end 23 has a second inner diameter, wherein the first inner diameter is less than a diameter of the disk 19, and wherein the second inner diameter is greater than the diameter of the disk 19. In one exemplary embodiment, the first inner diameter of receptacle 17 is between about 0.75 inches and about 1.25 inches, and the second inner diameter of the receptacle 17 is between about 3.5 inches and about 5.5 inches. Gap 25 should have sufficient size to provide an arthropod pathway into the receptacle 17. The size of the arthropod pathway may vary according to the scale of the trap 10, to allow a targeted arthropod to move around the perimeter of disk 19 into the receptacle 17. In one embodiment, the arthropod pathway or gap 25 has a width between about 1 mm and about 3 mm. In another embodiment, gap 25 is configured by ensuring that the distal inner diameter of receptacle 17 at end 23 is at least 3 mm greater than the diameter of the disk 19. The shape of the receptacle between the first and second diameters may be contoured, cylindrical, or conical. Skilled artisans will recognize that many alternative shapes and sizes of a receptacle 17 are possible within the scope of the invention.

Disk 19 is attached to a distal end of pole 11 by rivet, adhesive, threaded attachment, or other conventional means, and is moveable within the receptacle 17. However, disk 19 is configured to limit proximal retraction of the pole 11 through the tube 13. In FIG. 2, disk 19 is shown in a retracted position, which is achieved by a user withdrawing pole 11 in a proximal direction through tube 13 until the perimeter of the disk 19 seals to an interior wall of the receptacle 17, where disk 19 reaches its proximal limit within the receptacle. Accordingly, receptacle 17 and disk 19 are configured to seal an interior volume of the receptacle to prevent an arthropod enclosed therein from escaping through any gap between the perimeter of the disk 19 and the inner wall of the receptacle 17. Disk 19 may be configured as a flat, circular plate and may be formed from a rigid material such as wood, metal, plastic, or hard rubber. A hard rubber or thermoplastic disk having slight flexibility helps to ensure a good seal between the disk 19 and receptacle 17 at the proximal limit. Disk thickness may vary according to material strength. In one embodiment, disk 19 is formed from steel plate, and has a thickness between about 0.12 and about 0.49 mm.

Receptacle 17 may be made from a rigid or slightly flexible material, such as rubber or plastic. Receptacle 17 may be opaque, partially transparent, or entirely transparent. Plastics such as acrylic, polycarbonate, and Plexiglas are examples of materials that are suitable for forming a receptacle according to the invention. Receptacle 17 may be attached directly to the distal end of tube 13 by friction fit or bonding agent (or both) to a rim protruding from the proximal opening of the receptacle 17. Alternatively, a connector 21 may be specially formed to effect attachment of the tube 13 to the receptacle 17, and to seal the distal end of tube 13 to a proximal end of the receptacle 17. For example, connector 21 may comprise a rounded nut having a central hole that fastens to the outer diameter of tube 13 by means of a friction fit or by threaded connection, wherein the distal end of tube 13 is configured with male threading and the central hole of connector 21 is configured with complementary female threading. The distal end of connector 21 may similarly be configured with threading for connection to the proximal end of receptacle 17. In FIG. 2, connector 21 may optionally be configured with female threading at its distal end, and is threaded onto complementary male threading formed on the rim that protrudes proximally from the proximal end of receptacle 17. Connector 21 may be formed from materials similar to tube 13 or receptacle 17, for example of metal by machining or of plastic by injection molding.

Figure 3:
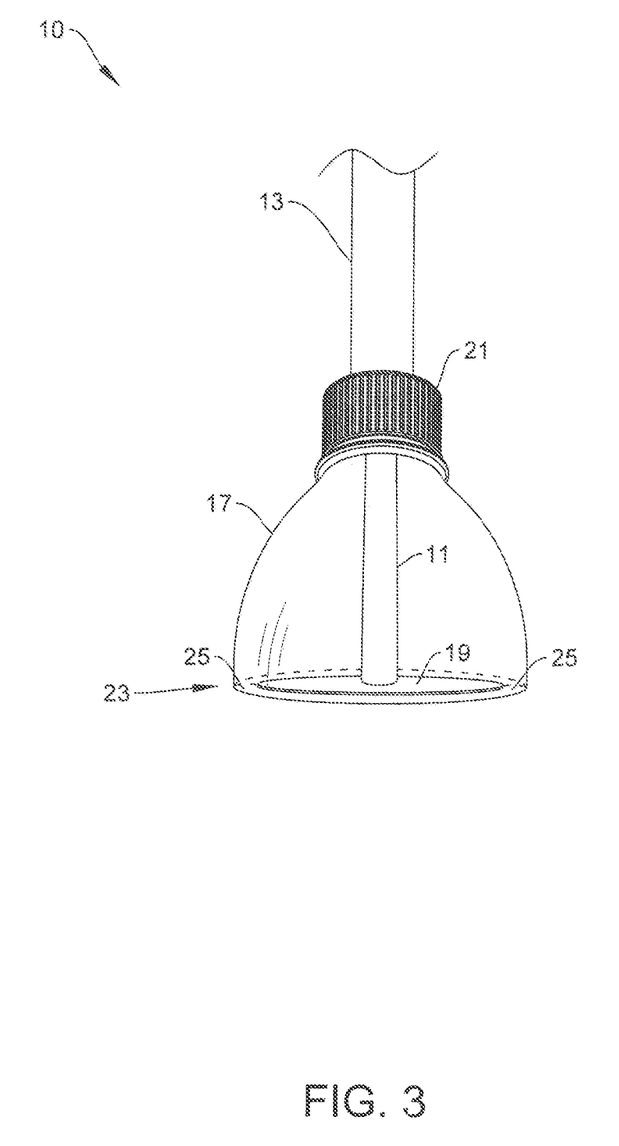
FIG. 3 is a magnified view of a distal end of the poleborne thrustable arthropod trap of FIG. 1, shown with the disk extended.

FIG. 3 shows another magnified view of a distal end of the poleborne thrustable arthropod trap 10. In this view, disk 19 is shown in an extended position, which is achieved by a user translating pole 11 in a distal direction through tube 13. In this extended position, disk 19 rests at, or is aligned with, the distal end 23 of the receptacle 17, to create an unobstructed circular gap 25 between the disk and the distal end of the receptable, as shown. In one embodiment of the invention, this distal location of disk 19 is its maximum distal location achieved when handle stop 15 abuts the proximal end of tube 13 to limit distal extension of the pole 11. In another embodiment, a similar configuration limits translation of the pole 11 in a distal direction to a position at which disk 19 has been thrust distally beyond the distal end 23 of receptacle 17.

Figure 4:
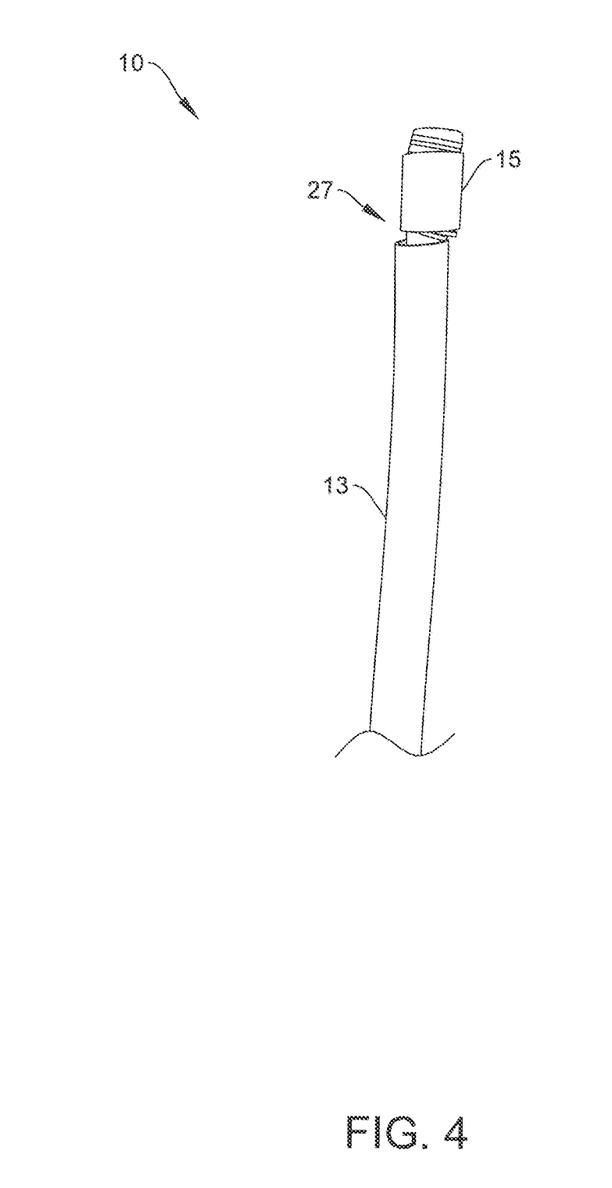
FIG. 4 is a magnified view of a proximal end of the poleborne thrustable arthropod trap of FIG. 1, shown with the disk extended.

FIG. 4 shows a magnified view of a proximal end of the poleborne thrustable arthropod trap 10, in a state in which pole 11 has been translated through tube 13 to its maximum distal limit. Consequently, disk 19 has also been thrust to its maximum distal limit. In this position, handle stop 15 abuts the proximal end 27 of tube 13. The means for limiting distal translation of the pole 11 through the tube 13 is effected by forming handle stop 15 with an outer width or diameter that is greater than the inner diameter of tube 13.

Figure 5:
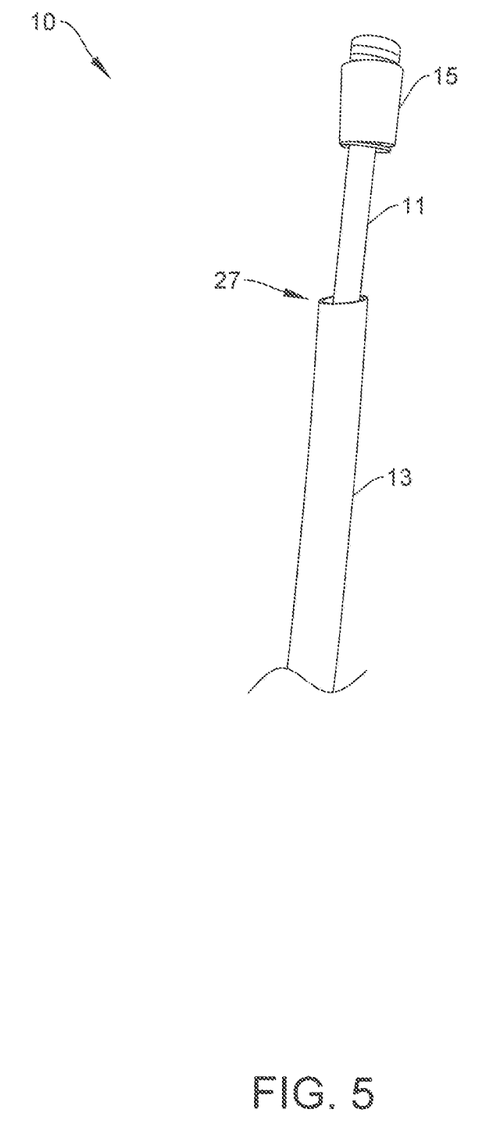
FIG. 5 is a magnified view of a proximal end of the poleborne thrustable arthropod trap of FIG. 1, shown with the disk retracted.
Figure 6A:
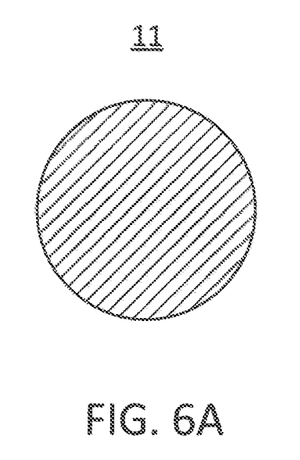
FIGS. 6A, 6B, 6C, and 6D show cross-sectional views of different embodiments of poles for use in a poleborne thrustable arthropod trap according to the present invention.
Figure 6B:
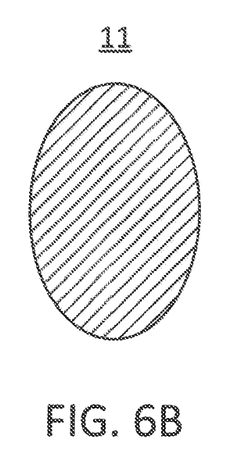
Figure 6C:
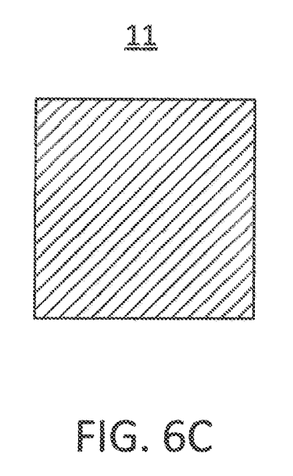
Figure 6D:
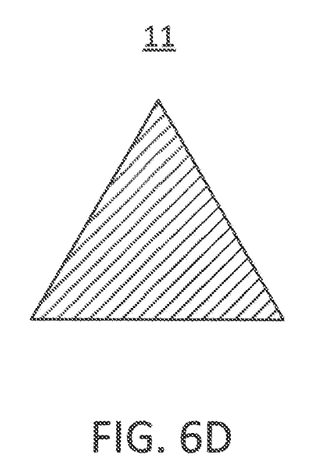

FIG. 5 shows a magnified view of a proximal end of the poleborne thrustable arthropod trap 10, in a state in which pole 11 has been retracted through the tube 13 to its proximal limit. In this position, handle stop 15 has been separated some distance from the proximal end 27 of the tube 13, and the disk 19 has reached its proximal limit where it forms a seal with an interior wall of the receptacle 17.

FIGS. 6A, 6B, 6C, and 6D show cross-sectional views of different embodiments of poles 11 for use in a poleborne thrustable arthropod trap 10 according to the present invention. These views, respectively show round, oval, square, and triangular cross sections of a pole 11. Any of these cross-sectional forms may comprise a means for creating friction between the pole 11 and a tube 13 that forms a slight arc. The oval cross-sectional form may comprise a means for creating friction between the pole 11 and a straight tube 13 that has a round cross-section. The square and triangular cross-sections are examples of multi-sided cross-sectional forms that may comprise a means for creating friction between the pole 11 and a tube 13 that has a circular cross-section. In these embodiments, during translation of the pole 11 through the tube 13 desired friction occurs by interference between corners of the pole and an inner wall of the tube, or between sides of the pole and an inner wall of the tube.

In operation, a user can manipulate a poleborne thrustable arthropod trap according to the invention to kill or capture an arthropod from a safe distance. The invention works best for trapping an arthropod against a flat surface, such as a floor, wall, or ceiling. A user wields the trap by grasping the tube 13 at an intermediate location with one hand, preferably near the proximal end. The user may grasp the handle stop 15 with the other hand. With the pole 11 withdrawn to a proximal position as shown in FIGS. 1, 2 & 5, the user thrusts the trap toward the arthropod, so that the distal end 23 of the receptacle 17 contacts the flat surface where the arthropod is lurking, suddenly enclosing the arthropod within the receptacle 17 and against the flat surface. The user may then, by distal extension of the pole 11 through the tube 13, thrust the disk 19 against the flat surface to squash and kill the arthropod. Alternatively, the user may slowly push the disk toward the arthropod to coax the arthropod into the receptacle by opening a pathway into the receptacle through gap 25. Experimental usage of the invention has demonstrated a tendency of spiders and insects to crawl through the gap to an opposite side of the disk 19 within the enclose 17 to avoid being crushed by the approaching disk. At s point, the user may retract the disk back into the receptacle to trap the arthropod therein. The trap now provides a convenient means for carrying the trapped arthropod to another location, such as outdoors, where it may be released by extending the disk to open the enclosure, and shaking trap to drive the bug out if necessary.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An arthropod trap, comprising:
a tube;
a pole extending through the tube, the tube and the pole configured to generate friction therebetween only by interference of an outer surface of the pole against an inner wall of the tube, the friction sufficient to maintain a position of the pole within the tube when the tube is stationed substantially vertically and the pole is under force of gravity only;
a handle stop attached to a proximal end of the pole and configured to limit distal extension of the pole through the tube to a distal limit;
a receptacle attached to a distal end of the tube; and
a disk moveable within the receptacle and attached to a distal end of the pole, the disk configured as a flat circular plate to limit proximal retraction of the pole through the tube to a proximal limit;
the trap configured so that when the pole is extended to the distal limit, the pole places the disk beyond a distal end of the receptacle to create an unobstructed circular gap between the disk and the distal end of the receptacle, and so that after the pole is extended to the distal limit, retraction of the pole to the proximal limit seals a perimeter of the disk to an interior wall of the receptacle.

2. The arthropod trap of claim 1, wherein the tube comprises a flexible material forming an arc from the distal end of the tube to a proximal end of the tube.

3. The arthropod trap of claim 2, wherein the arc has a height-to-width ratio between about 0.02 and 0.03.

4. The arthropod trap of claim 2, wherein the pole comprises a rigid cylinder having an outer diameter less than an inner diameter of the tube.

5. The arthropod trap of claim 1, wherein the handle stop has a width greater than an inner diameter of the tube.

6. The arthropod trap of claim 1, wherein the receptacle is transparent.

7. The arthropod trap of claim 1, wherein the receptacle has a proximal opening having a first inner diameter, and a distal opening having a second inner diameter, wherein the first inner diameter is less than a diameter of the disk, and wherein the second inner diameter is greater than the diameter of the disk.

8. The arthropod trap of claim 7, wherein the second inner diameter is at least 3 cm greater than the diameter of the disk.

9. The arthropod trap of claim 1, further comprising a connector configured to seal the distal end of the tube to a proximal end of the receptacle.

10. The arthropod trap of claim 1, wherein the disk is formed from a rigid material.

11. A poleborne thrustable arthropod trap, comprising:
a tube;
a pole translatable through the tube, the tube and the pole configured to generate friction therebetween only by interference of an outer surface of the pole against an inner wall of the tube, the friction sufficient to maintain a position of the pole within the tube when the tube is stationed substantially vertically and the pole is under force of gravity only;
means for limiting translation of the pole through the tube to a proximal limit and to a distal limit;
a receptacle attached to a distal end of the tube; and
a disk configured as a flat circular plate and attached to a distal end of the pole;
wherein translation of the pole to the distal limit places the disk beyond a distal end of the receptacle and opens an arthropod pathway into the receptacle; and
wherein after the translation of the pole to the distal limit, translation of the pole to the proximal limit seals a perimeter of the disk to an interior wall of the receptacle.

12. The poleborne thrustable arthropod trap of claim 11, wherein the pole has a multi-sided cross-section and wherein the tube has a circular cross-section.

13. The poleborne thrustable arthropod trap of claim 11, wherein the tube forms an arc from the distal end of the tube to a proximal end of the tube, wherein the pole is substantially straight, and wherein the interference occurs between edges of the pole and the inner wall of the tube.

14. The poleborne thrustable arthropod trap of claim 13, wherein the arc has a height-to-width ratio between about 0.02 and 0.03.

15. The poleborne thrustable arthropod trap of claim 11, wherein the receptacle is transparent.

16. The poleborne thrustable arthropod trap of claim 1, wherein the disk is formed from a flexible material to ensure a good seal between the disk and the receptacle at the proximal retraction limit.

17. The poleborne thrustable arthropod trap of claim 11, wherein the disk is formed from a flexible material to ensure a good seal between the disk and the receptacle at the translation limit in the proximal direction.

18. The poleborne thrustable arthropod trap of claim 11, wherein the pole has an outer diameter substantially equivalent to an inner diameter of the tube such that the outer surface of the pole when translated through the tube interferes with the inner wall of the tube to generate the friction.

19. The poleborne thrustable arthropod trap of claim 11, wherein the pole has an oval cross-section having a maximum width which is substantially equivalent to an inner diameter of the tube such that the outer surface of the pole when translated through the tube interferes with the inner wall of the tube to generate the friction.

* * * * *